Feb. 2, 1937. N. FRANK 2,069,437
PISTON AND PACKING
Filed July 10, 1935 2 Sheets-Sheet 2
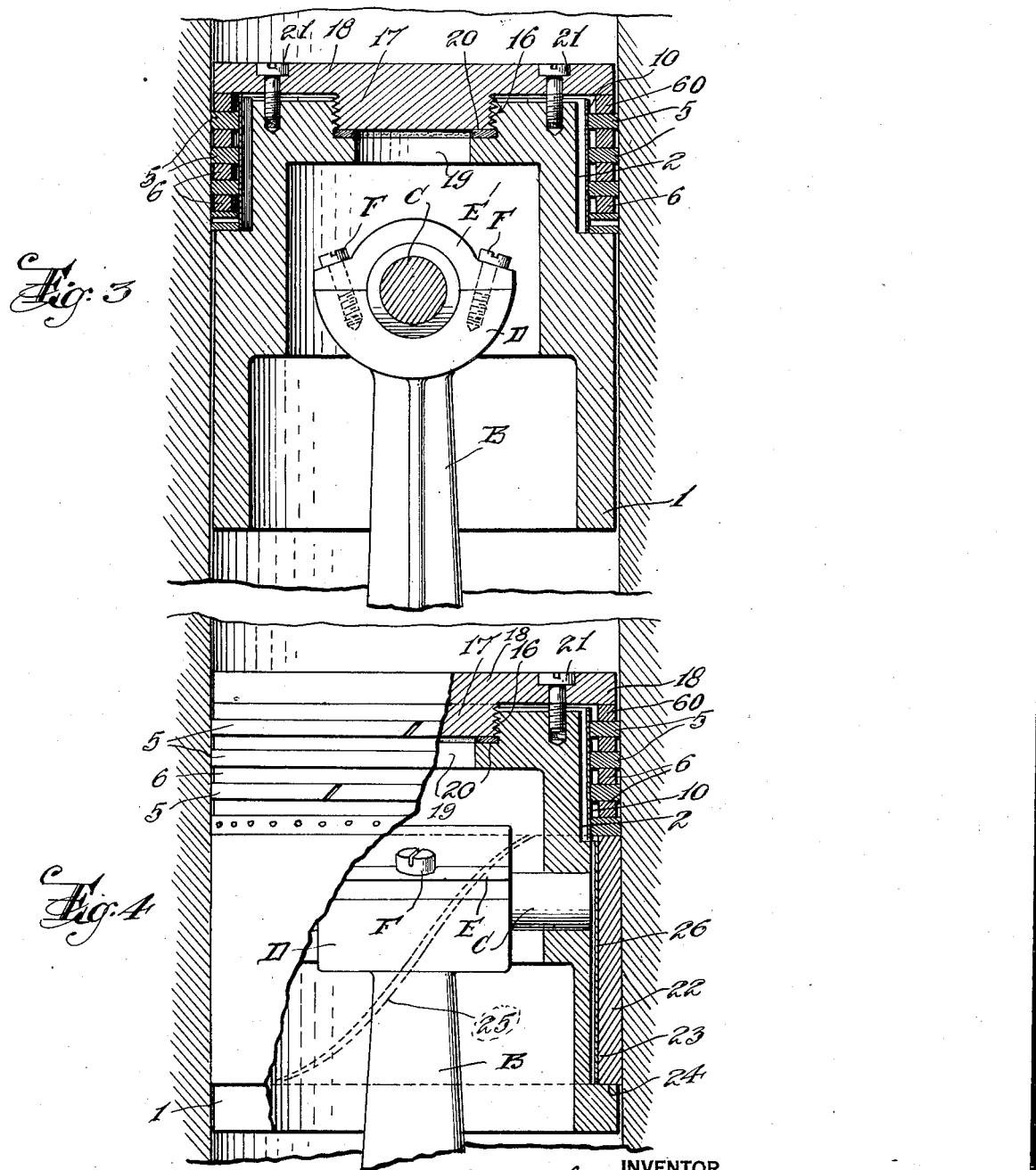

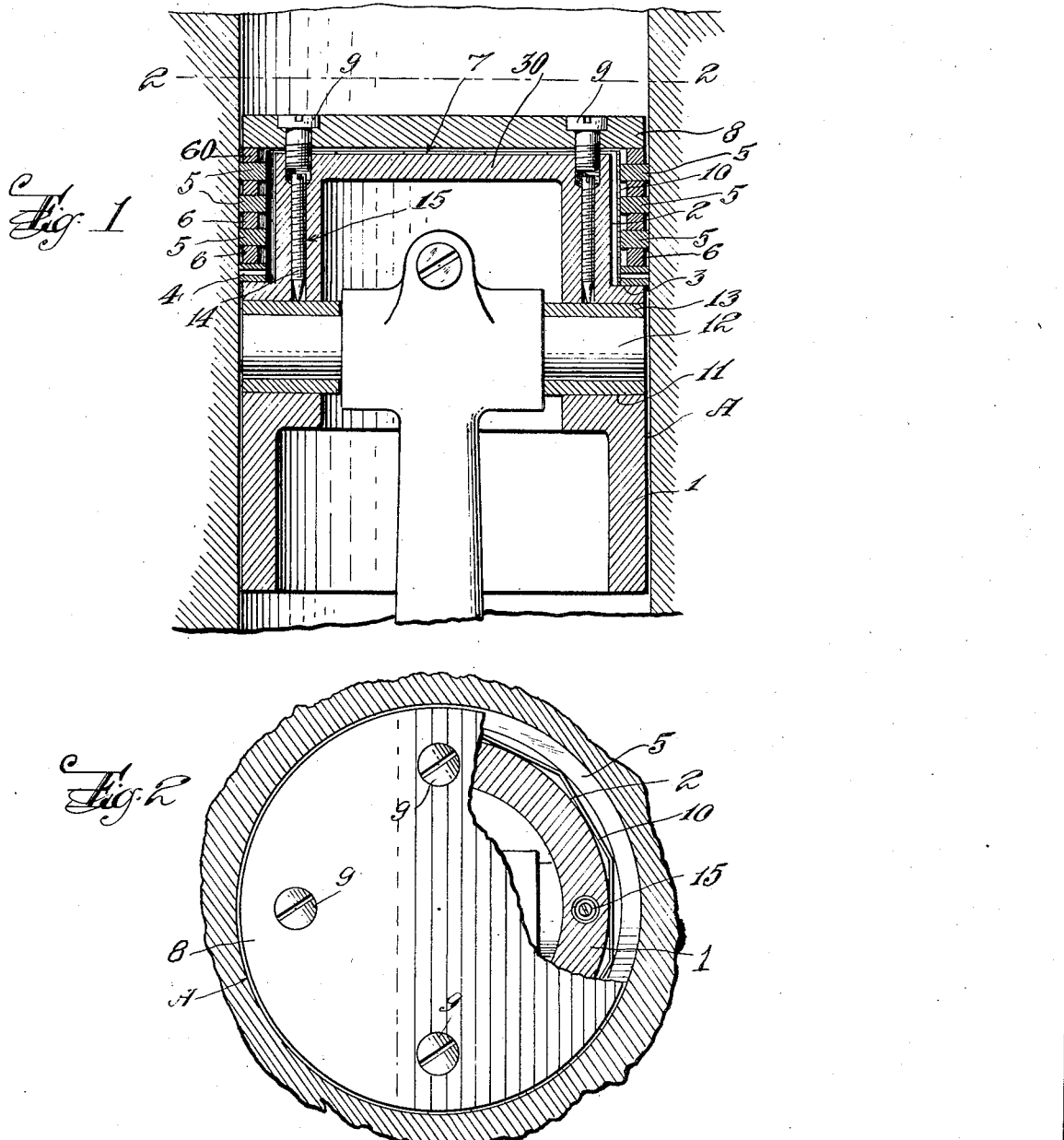

Patented Feb. 2, 1937

2,069,437

UNITED STATES PATENT OFFICE 2,069,437

PISTON AND PACKING

Nathan Frank, Newark, N. J., assignor to Colonial Capital Corporation, Newark, N. J., a corporation of New Jersey Application July 10, 1935, Serial No. 30,594

4 Claims. (Cl. 309—15)

This invention relates to a combination of a piston and packing for internal combustion engines, pumps and similar machines, one object of the invention being to provide a novel and improved construction and combination of this character whereby the piston rings can be easily and quickly assembled upon and removed from the piston without removing the cover of the crank case of the engine and without removing the piston from the cylinder.

Another object is to provide such a combination of a piston and packing embodying novel and improved features of construction which shall include a plurality of packing rings and spacing rings therefor as substitutes for the usual lands or ribs and ring grooves in the piston, whereby the packing rings and spacing rings can be easily and quickly applied to and removed from a piston at the head thereof while the piston is in its cylinder.

A further object is to provide such a combination of piston, packing rings and spacing rings and novel and improved means for holding the packing rings and spacing rings in place on the piston whereby wear upon the contacting faces of the packing rings and spacing rings may be compensated without removing the piston from the cylinder to maintain substantially fluid tight contact between the packing rings and spacers.

A further object is to provide in a piston including a wrist pin and bearing bushing therefor mounted in the walls of a piston, novel and improved means for taking up wear between the bushings and the piston.

Another object is to provide in such a piston novel and improved means for taking up wear between the connecting rod or pitman and the wrist pin.

Other objects are to provide a novel and improved combination of the general character described which shall include a removable expansible skirt for the piston to reduce or prevent sideslap of the piston in the cylinder; to provide a combination of a piston, packing rings and spacers of the character described whereby the head end of the piston shall be reenforced or strengthened without substantial increase in weight over known types of pistons; to provide a combination of the character described whereby the compression in different cylinders of the same engine embodying combined pistons and packing rings as described can be varied and balanced by simple interchange of spring expanders for the rings; and to obtain other advantages and results as will be brought out by the following description.

Referring to the accompanying drawings in which corresponding and like parts are designated throughout the several views by the same reference characters, Figure 1 is a vertical longitudinal sectional view through a combined piston and packing embodying my invention, showing the piston in a cylinder which is fragmentarily illustrated.

Figure 2 is a horizontal sectional view on the line 2—2 of Figure 1 with portions of the piston broken away.

Figure 3 is a view similar to Figure 1 showing a modification of the invention, and Figure 4 is a like view showing another form of the invention.

Specifically describing the embodiment of the invention illustrated in Figures 1 and 2 the reference character 1 designates the body of the piston which has a reduced cylindrical portion 2 at the head end thereof forming a shoulder 3 facing in the direction of the head 30. Seated upon the shoulder 3 and surrounding the extension 2 are shown an oil control ring 4 of known construction superposed upon which in alternate relation are a plurality of resilient split packing rings 5 and endless spacer rings 6. The spacer rings take the place of the usual ribs or lands and piston ring grooves, and the thickness of the various rings 4, 5 and 6 is such that when the rings are assembled on the piston the outermost spacer 60 projects slightly above the outer surface 7 of the head of the piston; and the various rings are held in position on the piston by a head clamping plate 8 which bears against the outermost spacer 60 and is secured to the piston by screws 9. By proper adjustment of the clamping plate 8 the rings 4, 5 and 6 may be held in substantially fluid tight sliding relation so that the packing and oil rings may contact with the walls of the cylinder in the usual manner. The internal and external diameters of the spacer rings 6 are greater and less respectively than the internal and external diameters of the packing rings and oil control rings, and for normally yieldingly influencing the packing and oil control rings into engagement with the cylinder walls A, a corrugated split spring expander 10 is interposed between the extension 2 on the piston and the inner peripheries of the rings, the width of the expander ring being sufficient to bridge all of the oil control and packing rings. Wear on the faces of all of the rings which contact with the cylinder, can be compensated by simply changing a single expander.

With this construction, it will be observed that the rings can be easily and quickly assembled upon and removed from the piston without removing the piston from the cylinder. In applying the rings, the clamping plate 8 is removed and the rings are dropped one by one in proper order over the extension 2 after which the plate 8 is clamped into position, while to remove the rings the reverse operation is performed. It will also be observed that wear of the various rings on their contacting surfaces may be compensated by interchanging outer spacer rings of different thicknesses. Adjustment for wear of the rings and replacement thereof are thus greatly facilitated by my invention. Moreover, the clamping plate 7 greatly reenforces the head of the piston.

The piston is shown as having the usual diametrically opposite bearing openings 11 for the wrist pin 12 and bearing bushings 13 for the wrist pin. To take up looseness in the bearing bushings which may result from wear, I may provide set screws 14 in screw threaded openings 15 which bear at one end against the corresponding bushings and are accessible at the head of the cylinder for adjustment. As shown, the openings 15 may be extensions of the openings in the piston head for the screws 9. A change in the volume of the compression chamber due to such slight adjustments of the relation of the piston to the connecting rod may be compensated by substituting a clamping plate of greater thickness.

A modification of the invention is shown in Figure 3 of the drawings wherein the clamping plate 18 for holding the oil control rings, packing rings and spacers on the piston is secured to the piston by a screw threaded boss 17 disposed centrally of the plate and fitted into a correspondingly threaded recess 16 in the head of the piston. The head of the cylinder and the clamping plate so modified facilitate taking up of the connecting rod bearing on the wrist pin. In this form of the invention, the end of the connecting rod B which is connected to the wrist pin C has a bearing D formed with a cap E at the side of the bearing adjacent the head of the piston; the cap being secured in position on the bearing by screws F.

The head of the piston has a central opening 19 leading into the recess 16 through which access may be obtained to the screws F for adjustment of the bearing cap. The opening 19 is closed by the threaded boss 17 on the clamping plate 18, and preferably a gasket 20 is provided to ensure a gas tight closure of the openings. To prevent accidental unscrewing of the clamping plate 18, holding screws 21 may be screwed through openings in the clamping plate into the head of the piston.

In Figure 4 a further modification is illustrated wherein a split resilient skirt sleeve 22 is removably mounted on the piston to reduce side slap of the piston. As shown, the lower end of the piston has a reduced portion 23 merging at one end into and of slightly greater diameter than the reduced portion 2. The other end of the reduced portion 22 terminates in an annular shoulder 24. The skirt sleeve 22 is longitudinally slit at 25 so as to be expansible and contractible and one end thereof is seated upon the shoulder 24. The other end of the skirt sleeve forms a seat for the stack of oil control, packing rings and spacers which may be held in position by a clamping plate like the plate 18 or the plate 8.

With this construction, the clamping plate holds the skirt sleeve in position on the piston and the skirt sleeve is expansible and contractible to adapt itself to the cylinder walls, even when they are distorted, so as to reduce or prevent back-slap of the piston in the cylinder. It may be desirable to supplement the inherent resiliency of the skirt with a spring expander 26 similar to the expander 10.

In addition to facilitating the application and removal of the piston rings to and from the piston, the invention makes it possible to adjust the compression in the cylinder by simply interchanging expanders 10 of different degrees of resiliency, this being greatly facilitated by the single expander ring cooperating with all of the packing and oil control rings of a given piston. Accordingly, should the compression in one cylinder of an engine be less than that in the other cylinders due to leakage around the packing rings, it is simply necessary to replace the expander ring of said cylinder with a stronger expander ring so as to reduce the leakage around the packing rings.

It will be understood that any desired number and type of packing rings, oil control rings and the like may be utilized, and the rings and piston may be formed of any suitable materials such as cast iron, aluminum, etc.

While I have shown and described my invention as embodied in certain details of construction, it should be understood that this is primarily for the purpose of illustrating the principles of the invention and that many modifications and changes may be made without departing from the spirit or scope of the invention.

Having thus described my invention, what I claim is:

1. In combination, a piston having a reduced cylindrical portion at its head end and a shoulder at the inner end of said reduced portion, a plurality of piston rings and spacers alternately arranged in stacked relation on said shoulder surrounding said reduced extension, and means adjustably connected to the top of the head of the piston and contacting with the outermost ring or spacer for holding said rings and spacers on the piston and to permit compensation for wear on the contacting sides of the spacers and rings, said spacers being endless rings having internal and external diameters greater and less respectively than said piston rings, and a split ring spring expander of corrugated sheet metal of a width to bridge all of said rings, surrounding said reduced portion, contacting all of said piston rings and free of said spacers, whereby only a single expander need be changed to compensate for wear on all of the faces of the rings.

2. In combination, a piston having a reduced cylindrical portion at its head end and a shoulder at the inner end of said reduced portion, a plurality of piston rings and spacers alternately arranged in stacked relation on said shoulder surrounding said reduced portion with a spacer outermost and projecting above the top surface of the piston head, a clamping plate adjustably secured on said top surface of the piston head in overlying contact with said outermost spacer for holding said rings and spacers on the piston, whereby outermost spacers of different thickness can be interchanged to compensate for wear on the contacting surfaces of the rings and spacers all of said rings and spacers being movable relatively to each other and said piston transversely of the latter, and a split ring spring expander interposed between said piston and said rings and spacers, bridging and contacting with the inner peripheries of all of said rings and free of said spacers, whereby only a single expander need be changed to compensate for wear on the faces of all of the rings.

3. In combination, a piston having a reduced cylindrical portion intermediate its ends and a second reduced portion of smaller diameter at the head end of the piston and meeting the first reduced portion at one end, the other end of said first reduced portion terminating in a shoulder, a split resilient skirt sleeve on said first reduced portion engaging said shoulder, a spring expander between said sleeve and the piston, a plurality of piston rings and spacers surrounding the second reduced portion and alternately arranged in stacked relation directly and solely on the end of said skirt sleeve to maintain tight sliding contact between the lowermost ring and said skirt sleeve, and means secured to the piston head in overlying relation to the stack of piston rings and spacers for holding the latter and said skirt sleeve on said piston, whereby leakage of gases between said skirt sleeve and said shoulder and between said sleeve and the lowermost ring is prevented.

4. In combination, a piston having a reduced cylindrical portion intermediate its ends and a second reduced portion of smaller diameter at the head end of the piston and meeting the first reduced portion at one end, the other end of said first reduced portion terminating in a shoulder, a split resilient skirt sleeve on said first reduced portion engaging said shoulder, a spring expander between said sleeve and the piston, a plurality of piston rings and spacers surrounding the second reduced portion and alternately arranged in stacked relation directly and solely on the end of said skirt sleeve, means adjustably connected to the top of the head of the piston and contacting with the outermost ring or spacer to maintain tight contact between the lowermost ring and said skirt sleeve, whereby the skirt sleeve is held snugly against said shoulder and leakage of gases between said skirt sleeve and said shoulder and between said sleeve and the lowermost ring is prevented, and a split ring spring expander interposed between said piston and said rings and spacers, bridging and contacting with the inner peripheries of all of said rings and free of said spacers.

NATHAN FRANK.